(12) United States Patent
Yin et al.

(10) Patent No.: US 11,199,863 B2
(45) Date of Patent: Dec. 14, 2021

(54) USER SIDE LOAD RESPONSE METHOD BASED ON ADJUSTMENT AND CONTROL ON TEMPERATURE OF LOAD CLUSTERS

(71) Applicants: STATE GRID JIANGSU ELECTRIC POWER CO., LTD, Jiangsu (CN); STATE GRID CORPORATION OF CHINA, Beijing (CN); STATE GRID JIANGSU ELECTRIC POWER COMPANY RESEARCH INSTITUE, Jiangsu (CN); SOUTHEAST UNIVERSITY, Jiangsu (CN)

(72) Inventors: Jijun Yin, Jiangsu (CN); Zuofeng Li, Jiangsu (CN); Gang Chen, Jiangsu (CN); Zhenyu Chen, Jiangsu (CN); Haifeng Li, Jiangsu (CN); Yefeng Jiang, Jiangsu (CN); Lin Liu, Jiangsu (CN); Qifeng Huang, Jiangsu (CN); Shufeng Lu, Jiangsu (CN); Bin Yang, Jiangsu (CN); Haowei Zhang, Jiangsu (CN); Xiao Chen, Jiangsu (CN); Qiang Zhou, Jiangsu (CN); Mingfeng Xue, Jiangsu (CN); Lingying Huang, Jiangsu (CN); Shihai Yang, Jiangsu (CN); Qingshan Xu, Jiangsu (CN); Minrui Xu, Jiangsu (CN); Zhixin Li, Jiangsu (CN); Shuangshuang Zhao, Jiangsu (CN); Feng Wang, Jiangsu (CN); Wenguang Chen, Jiangsu (CN)

(73) Assignees: STATE GRID JIANGSU ELECTRIC POWER CO., LTD; STATE GRID CORPORATION OF CHINA; STATE GRID JIANGSU ELECTRIC POWER COMPANY RESEARCH INSTITUE; SOUTHEAST UNIVERSITY

( * ) Notice: Subject to any disclaimer, the term of this patent is extended or adjusted under 35 U.S.C. 154(b) by 276 days.

(21) Appl. No.: 16/398,806

(22) Filed: Apr. 30, 2019

(65) Prior Publication Data

US 2020/0209901 A1  Jul. 2, 2020

(30) Foreign Application Priority Data

Dec. 26, 2018  (CN) .......................... 201811604378.7

(51) Int. Cl.
 *G05F 1/46* (2006.01)
 *G05B 17/02* (2006.01)
 (Continued)

(52) U.S. Cl.
 CPC ............. *G05F 1/462* (2013.01); *G05B 17/02* (2013.01); *G05D 23/1917* (2013.01); *G05F 1/66* (2013.01); *G06F 9/4893* (2013.01); *G06F 17/11* (2013.01)

(58) Field of Classification Search
 CPC .............................. G05F 1/462; G05B 17/02
 (Continued)

(56) References Cited

U.S. PATENT DOCUMENTS

2006/0276938 A1* 12/2006 Miller ...................... H02J 3/32
                                                                  700/295
2010/0204844 A1*  8/2010 Rettger .................. H02J 3/381
                                                                  700/291
(Continued)

FOREIGN PATENT DOCUMENTS

| CN | 203299668 | 11/2013 |
| CN | 104184211 | 12/2014 |

(Continued)

OTHER PUBLICATIONS

Blanford, et al. Simulating Annual Variation in Load, Wind, and Solar by Representative Hour Selection, The Energy Journal, vol. 39, No. 3. (Year: 2018).*

(Continued)

*Primary Examiner* — Robert A Cassity
(74) *Attorney, Agent, or Firm* — McDonald Hopkins LLC

(57) ABSTRACT

Provided is a user side load response method based on adjustment and control on temperature of load clusters. The user side load response method includes: performing thermodynamic modeling on a temperature control load to obtain a temperature control model in direct load control;

(Continued)

constructing a mapping quantity to describe the change state of a temperature control load relay switch; obtaining adjustable capacity of the temperature control load through the mapping quantity; introducing temperature control load clusters to solve the problem that control precision cannot satisfy condition requirements; and finally calculating the influence of each load cluster in different load cluster control schemes on comfort degree.

14 Claims, 10 Drawing Sheets

(51) Int. Cl.
*G05D 23/19* (2006.01)
*G05F 1/66* (2006.01)
*G06F 9/48* (2006.01)
*G06F 17/11* (2006.01)

(58) Field of Classification Search
USPC .......................................................... 700/286
See application file for complete search history.

(56) References Cited

U.S. PATENT DOCUMENTS

| 2013/0226360 | A1* | 8/2013 | Wilkins | H02J 3/06 |
| | | | | 700/295 |
| 2016/0118795 | A1* | 4/2016 | Berkowitz | H02J 3/1807 |
| | | | | 700/286 |
| 2016/0195866 | A1 | 7/2016 | Turney et al. | |

FOREIGN PATENT DOCUMENTS

| CN | 104636987 | 5/2015 |
| CN | 108181947 | 6/2018 |

OTHER PUBLICATIONS

Lovegrove, et al. Comparison of dispatchable renewable electricity options, Technologies for an orderly transition (Year: 2018).*
Patent Cooperation Treaty (PCT), International Search Report and Written Opinion for Application PCT/CN2018/125839 filed on Dec. 29, 2018, dated Mar. 27, 2019, International Searching Authority, CN.

* cited by examiner

USER SIDE LOAD RESPONSE METHOD BASED ON ADJUSTMENT AND CONTROL ON TEMPERATURE OF LOAD CLUSTERS

CROSS-REFERENCE TO RELATED APPLICATIONS

This application claims priority to a Chinese patent application No. 201811604378.7 filed on Dec. 26, 2018, disclosure of which is incorporated herein by reference in its entirety.

TECHNICAL FIELD

The present disclosure relates to the technical field of adjustment and control on a user side load, and particularly to a user side load response method based on adjustment and control on temperature of load clusters.

BACKGROUND

In recent years, Chinese power grid adjustment merely occurs at electricity generation side, and when the electricity generation side adjustment is developed to be mature, trade monopoly is formed. Since merely the electricity generation side adjustment exists, the price of power grid adjustment is determined by the electricity generation side, which seriously influences the economy of the power grid.

In another aspect, due to rapid development of new energy resources and a peak load of electric power, the dispatching and operating difficulty of the power grid is increased, so that a new great challenge is put forward for the adjustment capacity of a power system. The ratio of new loads having bidirectional interaction capability with the power grid and having double features of sources and loads, such as electric automobiles and water storage power stations is continuously increased. Meanwhile, a part of traditional loads can also adjust their electricity consumption requirements according to excitation or electricity price, so that the rapid adjustment response capability of a user side load on the power grid is formed. User side controllable loads mainly include an industrial controllable load, a commercial controllable load and a resident controllable load. Where most of the controllable loads are temperature control loads, such as air conditioners, refrigerators and heaters. The temperature control loads refer to load devices which can convert electric energy into heat energy in a certain proportion and store the heat energy through one or more energy storage media and which can achieve conversion of electricity energy and heat energy through means of temperature adjustment and the like. The temperature control loads can perform energy storage within several minutes and even several hours. Compared with electricity generation side resources, the resident loads are dispersed and can provide a rapid response within several minutes and even within a shorter time to make up the power vacancy of a system, thereby improving the voltage stability of the system.

For scholars at home and abroad, their attention is drawn to the changes of load characteristics of a user side virtual power station. Load side power grid adjustment becomes a research hotspot, which not only fully utilizes the load characteristics, but also breaks through the monopoly form of power grid adjustment on the electricity generation side, thereby facilitating the formation of a power grid bidding mechanism, facilitating quick maintenance of stability of the power grid and facilitating the healthy development of the power grid.

Research indicates that the requirement response rate of power terminal devices such as air conditioners and illumination devices can reach a minute level and even a second level. The probability that a large number of power terminal devices in the temperature control load refuses operation at the same time is very low, and the reliability of an auxiliary service provided by a temperature control load response is usually higher than that provided by a traditional generating set. Therefore, the resident load as a requirement response has great development space in actively participating in and responding to power grid adjustment.

A control method of the temperature control load mainly includes direct load control (DLC). However, in the DLC, a dispatchable capacity of the load is calculated by using a temperature setting value of the temperature control load as a definite value without considering dynamic changes of the temperature setting value. In recent research, the dynamic changes of the temperature setting value are considered, which are mainly based on load group control in which time is uniformly distributed by a single temperature control load device or a device of the same model. For the load group control, uncertainty of the total number of the loads and the parameters bring difficulty on precise calculation of a computer. Therefore, it is urgent to put forward a method for calculating the dispatching capacity of a load through the computer while considering the dynamic changes of the temperature setting of the temperature control load in the field.

SUMMARY

In order to overcome defects in a related art, the present disclosure provides a user side load response method based on adjustment and control on temperature of load clusters, so as to solve the problem that the response precision is low because a temperature control load adjustment method is low in adjustment precision and a traditional load response method cannot deal with different temperature control precisions on load individuals.

In order to achieve the above objective, a first aspect of the present disclosure adopts the following technical solution.

A user side load response method based on adjustment and control on temperature of load clusters includes:

receiving a dispatching command sent from a dispatching center at a time point t, wherein the dispatching command is an expected dispatchable capacity $D_{ref}(t)$ at the time point t;

performing calculation to obtain an actual dispatchable capacity $D(t)$ of a temperature control load at the time point t;

obtaining a controlled temperature setting value $\theta_{ref}$ corresponding to the expected dispatchable capacity $D_{ref}(t)$, and obtaining a to-be-controlled temperature value $\theta_t$ corresponding to the actual dispatchable capacity $D(t)$;

calculating a temperature change quantity $u(t)$ of the temperature control load at the time point t through $\theta_{ref} - \theta_t$; and dividing a temperature control load group that participates in adjustment and control into a plurality of temperature control load clusters, and performing calculation to obtain a temperature change quantity $u_i(t)$ of each of the plurality of temperature control load clusters according to the temperature change quantity $u(t)$.

In above method, the dividing the temperature control load group that participates in adjustment and control into the plurality of temperature control load clusters specifically includes:

dividing the temperature control load group into the plurality of temperature control load clusters according to types of temperature control loads.

In above method, the performing calculation to obtain a temperature change quantity $u_i(t)$ of each of the plurality of temperature control load clusters according to the temperature change quantity $u(t)$ includes:

$$u_i(t) = \begin{cases} \text{floor}\left[\frac{u(t)}{\Delta u'}\right]\Delta u' & \text{if } l > L\frac{\text{mod}(u(t), \Delta u')}{\Delta u'} \\ \text{floor}\left[\frac{u(t)}{\Delta u'}\right]\Delta u' + \Delta u' & \text{if } l \le L\frac{\text{mod}(u(t), \Delta u')}{\Delta u'} \end{cases}.$$

Where floor[•] is a function which takes an integer value of [•], mod(•) represents a remainder of $u(t)/\Delta u'$, l represents a serial number of one of load clusters, L represents a number of the load clusters, and $\Delta u'$ represents a temperature adjustment precision of the temperature control loads.

Switching-on powers of all the temperature control loads are the same, and the performing calculation to obtain the actual dispatchable capacity D(t) of the temperature control load at the time point t includes:

$$D(t) \approx \frac{1}{6} + \frac{1}{6}\text{erf}\left[\frac{\ln(1) - \ln(\mu_x(0) + \mu_v t)}{\sqrt{2}\,\sigma_{ref}}\right] + \frac{1}{2} \times \sum_{j=2}^{\infty} (-1)^{j+1}\text{erf}\left[\frac{\ln(j) - \ln(\mu_x(0) + \mu_v t)}{\sqrt{2}\,\sigma_{ref}}\right].$$

Where output power P and equivalent thermal resistances R of all the temperature control loads are the same, an equivalent thermal capacity C follows logarithmic normal distribution and has $\ln(C) \sim N(\mu_C, \sigma_C)$, wherein erf[•] is a gauss error function, $\mu_x(t)$ is an average value of a change state mapping quantity $x_i(t)$ of a temperature control load relay switch at time point t, $\sigma_{ref}$ is a ratio of a variance to a mathematical expectation and has $$\sigma_{ref} = \frac{\sigma_C}{\mu_C}.$$

Wherein $\mu_C$ is a mathematical expectation of capacitance distribution, $\sigma_C$ represents a variance of the capacitance distribution, $\mu_x(0)$ is an average value of a change state mapping quantity $x_i(0)$ of the temperature control load relay switch at an initial time, and $\mu_v$ represents a mathematical expectation of a temperature change speed, and j is a positive integer.

The performing calculation to obtain the actual dispatchable capacity D(t) of the temperature control load at the time point t includes:

P is an output power of the temperature control load, R is an equivalent thermal resistance, C is an equivalent thermal capacity of the temperature control load and follows a logarithmic normal distribution, wherein a state switching period T of a temperature control load relay satisfies $T \approx 2/\mu_v$, a largest amplitude A(t) of D(t) decays with time and has $1 - \text{erf}(1/z(t)) \le A(t) \le \text{erf}(1/z(t))$, wherein $z(t) = 2\sqrt{2}\sigma_{ref}(\mu_x(0) + \mu_v t - \frac{1}{2})$, and the actual dispatchable capacity D(t) of the temperature control load is expressed as follows:

$$D(t) = D_{SS}(\theta_{ref}) + L^{-1}(\{G_P(s)0.5/s\}).$$

Where $L^{-1}\{\cdot\}$ represents an inverse Laplace transform, $G_P(s)$ is a transfer function of a second-order linear time-invariant system, $D_{SS}(\theta)$ represents a dispatchable capacity of the temperature control load group when a temperature setting value θ is stable, $\theta_{ref}$ represents a temperature setting value, $\sigma_{ref}$ is a ratio of a variance to a mathematical expectation, $\mu_v$ represents a mathematical expectation of a temperature change speed, $\mu_x(t)$ is an average value of a change state mapping quantity $x_i(t)$ of a temperature control load relay switch at time point t, and $\mu_x(0)$ is an average value of a change state mapping quantity $x_i(0)$ of the temperature control load relay switch at an initial time.

Further, the controlled temperature setting value $\theta_{ref}$ corresponding to the expected dispatchable capacity $D_{ref}(t)$ and the to-be-controlled temperature value $\theta_r$ corresponding to the actual dispatchable capacity D(t) are obtained according to the following formulas:

$$G_p(s) = \frac{b_2 s^2 + b_1 s + b_0}{s^2 + 2\xi\omega_n s + \omega_n^2};$$

$$\xi = \frac{\ln(r)}{\sqrt{\pi^2 + \ln^2(r)}};$$

$$\omega_n = \frac{\pi\mu_v}{\sqrt{1 - \xi^2}};$$

$$b_0 = \frac{\omega_n^2(D_{SS}(\theta_{ref} + 0.5) - D_{SS}(\theta_{ref}))}{0.5};$$

$$b_1 = 0.5\mu_v + 2D_{SS}(\theta_{ref})\xi\omega_n$$

$$b_2 = D_{SS}(\theta_{ref});$$

$$r = \frac{\left|\text{erf}\left(\frac{1}{0.9 + 2\sqrt{2}\,\sigma_{ref}}\right) - 0.5\right|}{\left|\text{erf}\left(\frac{1}{0.9}\right) - 0.5\right|};$$

$$D_{SS}(\theta) = \left(1 + \frac{\log\left(1 + \frac{H}{\theta_a - \theta - H/2}\right)}{\log\left(1 + \frac{H}{PR + \theta - \theta_a - H/2}\right)}\right)^{-1}.$$

Where s is a complex variable, $b_0$, $b_1$ and $b_2$ are coefficients of the complex variable, ξ represents a frequency domain transformation coefficient, $\omega_n$ represents a frequency domain independent variable, $D_{SS}(\theta)$ represents the dispatchable capacity of the temperature control load group when the temperature setting value θ is stable, $\theta_{ref}$ represents the temperature setting value, H represents a temperature control interval and has $H = \theta_+ - \theta_-$, θ represents the temperature value, and $\theta_a$ represents an environment temperature.

Further, the change state mapping quantity $x_i(t)$ of the ith temperature control load relay switch is expressed as:

$$x_i(t) = x_i^0 + v_i t.$$

$$\text{Where } \left|\frac{d\theta_i(t)}{dt}\right| \approx v_i = \frac{\theta_a - \theta_{ref}}{C_i R_i},$$

$$\text{and } x_i^0 = \begin{cases} 1 + \theta_i(0) - \theta_-^{post} & \text{if } \frac{d\theta_i(0^-)}{dt} > 0 \\ \theta_+^{post} - \theta_i(0) & \text{if } \frac{d\theta_i(0^-)}{dt} < 0 \end{cases}.$$

Where $\theta_i(t)$ represents a temperature value of an energy storage medium of an ith temperature control load at the time point t, $v_i$ represents a temperature change rate of the ith temperature control load at the time point t, $C_i$ represents an equivalent thermal capacity of the ith temperature control load, $R_i$ represents an equivalent thermal resistance of the ith temperature control load, $x_i^0$ represents a value of the state mapping quantity of the ith temperature control load relay switch at the initial time, $\theta_+^{post}$ and $\theta_-^{post}$ respectively represent an upper limit value and a lower limit value of the temperature after temperature control, $\theta_i(0)$ represents an internal temperature of the load energy storage medium of the ith temperature control load at the initial time, and $\theta_i(0^-)$ represents an internal temperature of the load energy storage medium of the ith temperature control load at a moment before the initial time.

Further, the temperature of the energy storage medium of each of temperature control loads satisfies the following formula:

$$\frac{d\theta(t)}{dt} = -\frac{1}{CR}[\theta(t) - \theta_a + m(t)RP + w(t)];$$

$$m(t^+) = \begin{cases} 0 & \text{if } \theta(t) \le \theta_- + u(t) \\ 1 & \text{if } \theta(t) \ge \theta_+ + u(t) \\ m(t) & \text{else} \end{cases}$$

Where $\theta(t)$ represents the temperature value of the energy storage medium of the temperature control load at the time point t, P is a constant output power when the temperature control load is switched on, w(t) represents an unpredictable thermal disturbing influence, m(t) represents relay states, m(t)=1 represents a switched-on state and m(t)=0 represents a switched-off state, t is time, $\theta_+$ represents an upper limit value of the temperature setting value before a load response; $\theta_-$ represents a lower limit value of the temperature setting value before a load response, $t^+$ represents a moment after the time point t, u(t) represents a change quantity of the temperature setting value at the time point t, and $m(t^+)$ represents a relay state at the moment after the time point t.

A second aspect of the present disclosure adopts the following technical solution.

A user side load response method based on adjustment and control on temperature of load clusters includes:

performing fundamental thermodynamic modeling on a temperature control load, and establishing a temperature control model directly controlled by loads;

constructing a mapping quantity to describe a change state of a temperature control load relay switch;

constructing a direct relation between the mapping quantity and an adjustable capacity of the temperature control load; and performing adjustment on the temperature change quantity of each of temperature control load clusters according to the temperature control load clusters.

In the user side load response method based on adjustment and control on temperature of load clusters, the temperature control model directly controlled by loads is:

$$\frac{d\theta(t)}{dt} = -\frac{1}{CR}[\theta(t) - \theta_a + m(t)RP + w(t)] \text{ and}$$

$$m(t^+) = \begin{cases} 0 & \text{if } \theta(t) \le \theta_- + u(t) \\ 1 & \text{if } \theta(t) \ge \theta_+ + u(t) \\ m(t) & \text{else} \end{cases} \quad (1)$$

Where $\theta(t)$ represents a temperature value of an energy storage medium of the temperature control load at time point t, $\theta_\alpha$ represents an environment temperature, C and R respectively represent an equivalent thermal capacity and an equivalent thermal resistance of the temperature control load, P represents a constant output power when the temperature control load is switched on, w(t) represents an unpredictable thermal disturbing influence, m(t) represents relay states, m(t)=1 represents a switched-on state and m(t)=0 represents a switched-off state, t represents time, $\theta_+$ represents an upper limit value of a temperature setting value before a load response, $\theta_-$ represents a lower limit value of the temperature setting value before the load response, $t^+$ represents a moment after the time point t, u(t) represents a change quantity of the temperature setting value at the time point t, and $m(t^+)$ represents a relay state at the moment after the time point t.

In the user side load response method based on adjustment and control on temperature of load clusters, the mapping quantity of a change state of the ith temperature control load relay switch $x_i(t)$ is expressed as:

$$x_i(t) = x_i^0 + v_i t. \quad (2)$$

$$\left|\frac{d\theta_i(t)}{dt}\right| \approx v_i = \frac{\theta_a - \theta_{ref}}{C_i R_i}; \quad (3)$$

$$x_i^0 = \begin{cases} 1 + \theta_i(0) - \theta_-^{post} & \text{if } \frac{d\theta_i(0^-)}{dt} > 0 \\ \theta_+^{post} - \theta_i(0) & \text{if } \frac{d\theta_i(0^-)}{dt} < 0 \end{cases} \quad (4)$$

Where $\theta_i(t)$ represents a temperature value of the energy storage medium of an ith temperature control device at the time point t, $v_i$ represents a temperature change rate of the ith temperature control device at the time point t, $\theta_{ref}$ represents a temperature setting value, $C_i$ represents an equivalent thermal capacity of the ith temperature control device, $R_i$ represents an equivalent thermal resistance of the ith temperature control device, $x_i^0$ represents a value of mapping quantity of the ith temperature control device at an initial time, $\theta_+^{post}$ and $\theta_-^{post}$ respectively represent an upper limit value and a lower limit value of the temperature after temperature control, $\theta_i(0)$ represents an internal temperature of the energy storage medium of the ith temperature control device at the initial time, and $\theta_i(0^-)$ represents an internal temperature of the energy storage medium of the ith temperature control device at the moment before the initial time.

In the user side load response method based on adjustment and control on temperature of load clusters, in condition that switching-on powers of all of temperature control loads are the same, an actual dispatchable capacity D(t) of the temperature control load is calculated by the following formula:

$$D(t) = \frac{Pr[x(t) < 1]}{3} + \sum_{k=1}^{\infty} Pr[x(t) < 2k+1] - Pr[x(t) < 2k]. \quad (5)$$

Where $Pr[\bullet]$ is a probability operator indicating a probability value of satisfying [•], k is a positive integer, and x(t) represents a set of the mapping quantity $x_i(t)$ of the temperature control device.

In the user side load response method based on adjustment and control on temperature of load clusters, in condition that output power P and equivalent thermal resistances R of all the temperature control loads are the same, the equivalent thermal capacity C follows a logarithmic normal distribution and has $\ln(C) \sim N(\mu_C, \sigma_C)$, the actual dispatchable capacity D(t) of the temperature control load can be approximately estimated as:

in condition that $$\sigma_{ref} = \frac{\sigma_C}{\mu_C},$$

$$D(t) \approx \frac{1}{6} + \frac{1}{6} erf\left[\frac{\ln(1) - \ln(\mu_x(0) + \mu_v t)}{\sqrt{2}\,\sigma_{ref}}\right] +$$

$$\frac{1}{2} \times \sum_{j=2}^{\infty} (-1)^{j+1} erf\left[\frac{\ln(j) - \ln(\mu_x(0) + \mu_v t)}{\sqrt{2}\,\sigma_{ref}}\right].$$

Where erf[•] is a gauss error function, and $\mu_x(t)$ is an average value of the mapping quantity x of the temperature control device at the time point t, $\sigma_{ref}$ is a ratio of a variance to a mathematical expectation, and $\mu_C$ is a mathematical expectation of capacitance distribution, $\sigma_C$ represents a variance of capacitance distribution, $\mu_x(0)$ is an average value of the mapping quantity x of the temperature control device at the initial time, $\mu_v$ represents a mathematical expectation of a temperature change speed, and j is a positive integer.

In the user side load response method based on adjustment and control on temperature of load clusters, R, P and C follow the logarithmic normal distribution, a state switching period time T of the temperature control load relay satisfies $T \approx 2/\mu_v$, a largest amplitude A(t) of D(t) decays with time and has; $1-erf(1/z(t)) \le A(t) \le erf(1/z(t))$, wherein $z(t)=2\sqrt{2}\sigma_{ref}(\mu_x(0)+\mu_v t-\frac{1}{2})$, and the actual dispatchable capacity D(t) of the temperature control load is expressed as follows:

$$D(t) = D_{SS}(\theta_{ref}) + L^{-1}\{G_P(s)0.5/s\} \tag{7}$$

Where $L^{-1}\{\cdot\}$ represents an inverse Laplace transform, and $G_P(s)$ is a transfer function of a second-order linear time-invariant system, $$G_p(s) = \frac{b_2 s^2 + b_1 s + b_0}{s^2 + 2\xi\omega_n s + \omega_n^2} \tag{8}$$

$$\xi = \frac{\ln(r)}{\sqrt{\pi^2 + \ln^2(r)}} \tag{9}$$

$$\omega_n = \frac{\pi\mu_v}{\sqrt{1-\xi^2}} \tag{10}$$

$$b_0 = \frac{\omega_n^2(D_{SS}(\theta_{ref}+0.5) - D_{SS}(\theta_{ref}))}{0.5} \tag{11}$$

$$b_1 = 0.5\mu_v + 2D_{SS}(\theta_{ref})\xi\omega_n \tag{12}$$

$$b_2 = D_{SS}(\theta_{ref}) \tag{13}$$

$$r = \frac{\left|erf\left(\frac{1}{0.9+2\sqrt{2}\,\sigma_{ref}}\right) - 0.5\right|}{\left|erf\left(\frac{1}{0.9}\right) - 0.5\right|} \tag{14}$$

$$D_{SS}(\theta) = \left(1 + \frac{\log\left(1 + \frac{H}{\theta_a - \theta - H/2}\right)}{\log\left(1 + \frac{H}{PR + \theta - \theta_a - H/2}\right)}\right)^{-1} \tag{15}$$

Where s is a complex variable, and $b_0$, $b_1$ and $b_2$ are coefficients of the complex variable; $\xi$ represents a frequency domain transformation coefficient, $\omega_n$ represents a frequency domain independent variable, $D_{SS}(\theta)$ represents a dispatchable capacity of the temperature control load group when a temperature setting value $\theta$ is stable, $\theta_{ref}$ represents a temperature setting value, H represents a temperature control interval and has $H=\theta_+ - \theta_-$, and $\theta$ represents a temperature value.

In the user side load response method based on adjustment and control on temperature of load clusters, the performing adjustment on the temperature change quantity of each of temperature control load clusters according to the temperature control load clusters includes:

sending a dispatching command by a dispatching center, wherein the dispatching command is an expected dispatchable capacity $D_{ref}(t)$ at the time point t;

calculating an actual dispatchable capacity D(t) of the temperature control device at the time point t according to a formula (6) or a formula (7), obtaining a controlled temperature setting value $\theta_{ref}$ corresponding to the expected dispatchable capacity $D_{ref}(t)$ and a to-be-controlled temperature value $\theta_t$ corresponding to the actual dispatchable capacity D(t) according to the expected dispatchable capacity $D_{ref}(t)$ and the actual dispatchable capacity D(t) and by use of formulas (8-15) and by performing a Laplace transformation, and calculating a temperature change quantity u(t) of the temperature control device at the time point t through $\theta_{ref} - \theta_t$; and dividing a temperature control load group into L temperature control load clusters according to types of temperature control loads, wherein a temperature adjustment signal of each of the temperature control load clusters is $u_i(t)$, so that a rough temperature adjustment quantity $\Delta u'$ of each of the temperature control loads is within a realizable range, and the temperature adjustment signal $u_i(t)$ of each of the load cluster is calculated through the following formulas:

$$u_i(t) = \begin{cases} floor\left[\frac{u(t)}{\Delta u'}\right]\Delta u' & if\ l > L\frac{mod(u(t),\Delta u')}{\Delta u'} \\ floor\left[\frac{u(t)}{\Delta u'}\right]\Delta u' + \Delta u' & if\ l \le L\frac{mod(u(t),\Delta u')}{\Delta u'} \end{cases} \tag{16}$$

Where floor[•] is a function which takes an integer value of [•]; mod(•) represents a remainder of $u(t)/\Delta u'$, l represents a serial number of one of load clusters, and L represents a number of the load clusters.

The present disclosure achieves the following beneficial effects.

The present disclosure considers the parameter difference of the temperature control device by proposing a method for adjusting the temperature control load clusters so that the calculation of the adjustable capacity of the temperature control device is more objective and practical; and The present disclosure adopts a load cluster control strategy by proposing the method for adjusting the temperature control load clusters so that the response precision of the temperature control load is improved.

DETAILED DESCRIPTION

The present disclosure is further described below in combination with drawings. The following embodiments are merely used for explaining the technical solution of the present disclosure more clearly, not used for limiting the protection scope of the present disclosure.

Figure 1:
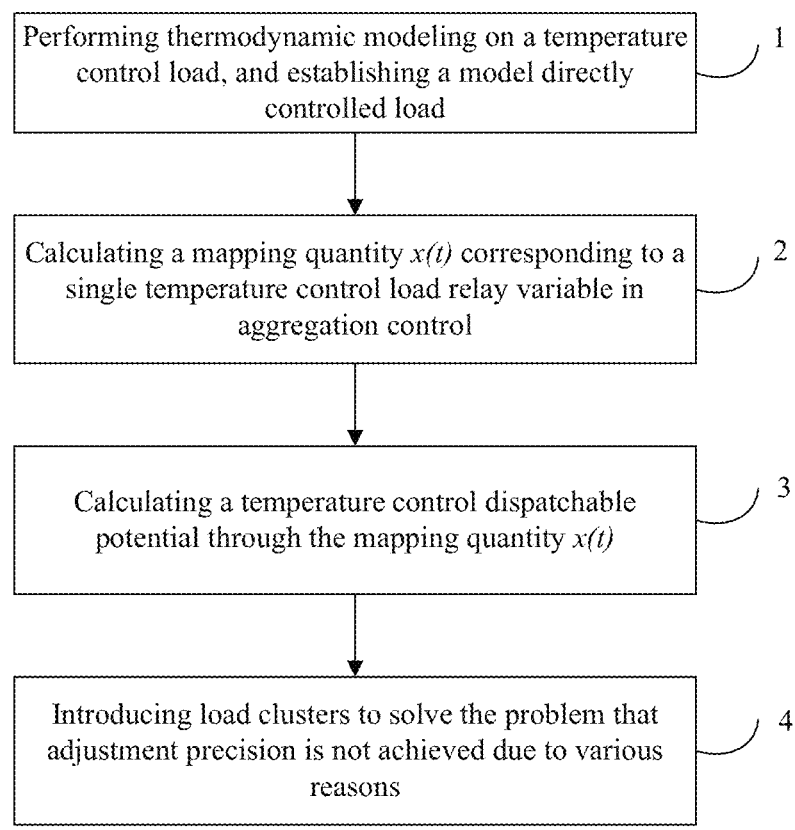
FIG. 1 is a flow chart illustrating a user side load response method in the present disclosure.

As shown in FIG. 1, a user side load response method based on adjustment and control on load clusters includes the steps:

In step 1, fundamental thermodynamic modeling on a temperature control load is performed, and a temperature control model directly controlled by loads is established.

The temperature control load is abstracted as a thermodynamic model and is abstracted to be formed by two parts: a constant power output device and a relay according to the actual working situation of the temperature control load. The relay has two states indicated by m(t). When the relay is in a switched-on state, the constant power output device outputs constant power, and the temperature of the energy storage medium of the temperature control load is adjusted. When the relay is in a switched-off state, the constant power output device does not output power, and the temperature of the energy storage medium changes following thermodynamic law. The formula of the temperature θ(t) of the energy storage medium is:

$$\frac{d\theta(t)}{dt} = -\frac{1}{CR}[\theta(t) - \theta_a + m(t)RP + w(t)];$$

$$m(t^+) = \begin{cases} 0 & \text{if } \theta(t) \leq \theta_- + u(t) \\ 1 & \text{if } \theta(t) \geq \theta_+ + u(t) \\ m(t) & \text{else} \end{cases} \quad (1)$$

Where θ(t) represents a temperature value of an energy storage medium of the temperature control load at time point t, $\theta_a$ represents an environment temperature, C and R respectively represent an equivalent thermal capacity and an equivalent thermal resistance of the temperature control load, P represents a constant output power when the temperature control load is switched on, w(t) represents an unpredictable thermal disturbing influence, m(t) represents relay states, m(t)=1 represents a switched-on state and m(t)=0 represents a switched-off state, t represents time, $\theta_+$ represents an upper limit value of a temperature setting value before a load response, $\theta_-$ represents a lower limit value of the temperature setting value before the load response, $t^+$ represents a moment after the time point t, $m(t^+)$ represents a relay state at the moment after the time point t, and u(t) represents a change quantity of the temperature setting value at the time point t.

In step 2, a mapping quantity to describe a change state of a temperature control load relay switch is constructed. the mapping quantity of a change state of the ith temperature control load relay switch is set as $x_i(t)$, and a direct relation between the adjustable capacity D(t) of the temperature control load and the mapping quantity $x_i(t)$ is defined.

The mapping quantity of a change state of the ith temperature control load relay switch is expressed by $x_i(t)$, i is a positive integer, and the $x_i(t)$ is expressed as follows:

$$x_i(t) = x_i^0 + v_i t. \quad (2)$$

Where $$\left|\frac{d\theta_i(t)}{dt}\right| \approx v_i = \frac{\theta_a - \theta_{ref}}{C_i R_i}; \quad (3)$$

$$x_i^0 = \begin{cases} 1 + \theta_i(0) - \theta_-^{post} & \text{if } \frac{d\theta_i(0^-)}{dt} > 0 \\ \theta_+^{post} - \theta_i(0) & \text{if } \frac{d\theta_i(0^-)}{dt} < 0 \end{cases}. \quad (4)$$

Where $\theta_i(t)$ represents a temperature value of the energy storage medium of an ith temperature control device at the time point t, $v_i$ represents a temperature change rate of the ith temperature control device at the time point t, $\theta_{ref}$ represents a temperature setting value, $C_i$ represents an equivalent thermal capacity of the ith temperature control device, $R_i$ represents an equivalent thermal resistance of the ith temperature control device, $x_i^0$ represents a value of mapping quantity of the ith temperature control device at an initial time, $\theta_+^{post}$ and $\theta_-^{post}$ respectively represent an upper limit value and a lower limit value of the temperature after temperature control, $\theta_i(0)$ represents an internal temperature of the energy storage medium of the ith temperature control device at the initial time, and $\theta_i(0^-)$ represents an internal temperature of the energy storage medium of the ith temperature control device at the moment before the initial time. The temperature adjustment deviation of the temperature control device set in the embodiment is 0.5 degree, so that $\theta_+-\theta_-=1$ and $\theta_+^{post}-\theta_-^{post}=1$.

When $x_i(t)$ reaches an integer value, the control state of the temperature control load changes once, i.e., the switched-on state of the relay is changed into the switched-off state, or the switched-off state of the relay is changed into the switched-on state. In the course that $x_i(t)$ changes into an even number from an odd number, the temperature control load relay is in the switched-off state, i.e., in the time m(t)=0, and in the course that $x_i(t)$ changes into an odd number from an even number, the temperature control load relay is in the switched-on state, i.e., that in the time, m(t)=1.

The size of the adjustable capacity of the temperature control load is expressed by D(t), the relation between the size of the adjustable capacity and the mapping quantity $x_i(t)$ is estimated as follows (the mapping quantity of a certain temperature control device is not specifically indicated below), and the set of the mapping quantity $x_i(t)$ of the temperature control device is expressed by x(t). In condition that the switched-on powers of all the temperature control loads are the same, the largest load change situation can be expressed by the value of the largest load capacity after per-unit value normalization treatment and can be equal to a probability value D(t). The largest power is outputted when D(t) is equal to 1. All the temperature control loads are switched on, and the adjustable capacity is the largest. The calculation formula of D(t) is as follows:

$$D(t) = \frac{Pr[x(t) < 1]}{3} + \sum_{k=1}^{\infty} Pr[x(t) < 2k+1] - Pr[x(t) < 2k]. \quad (5)$$

Where Pr[•] is a probability operator indicating a probability value of satisfying [•], k is a positive integer.

In step 3, two situations exist. The first situation: in condition that output power P and equivalent thermal resistances R of all the temperature control loads are the same, the equivalent thermal capacity C follows a logarithmic normal distribution and has $ln(C) \sim N(\mu_C, \sigma_C)$, and D(t) can be approximatively estimated as:

in condition that $$\sigma_{ref} = \frac{\sigma_C}{\mu_C},$$

$$D(t) \approx \frac{1}{6} + \frac{1}{6} erf\left[\frac{ln(1) - ln(\mu_x(0) + \mu_v t)}{\sqrt{2}\,\sigma_{ref}}\right] + \quad (6)$$

$$\frac{1}{2} \times \sum_{j=2}^{\infty} (-1)^{j+1} erf\left[\frac{ln(j) - ln(\mu_x(0) + \mu_v t)}{\sqrt{2}\,\sigma_{ref}}\right].$$

Where erf[•] is a gauss error function, and $\mu_x(t)$ is an average value of the mapping quantity x of the temperature control device at the time point t, $\sigma_{ref}$ is a ratio of a variance to a mathematical expectation, and $\mu_C$ is a mathematical expectation of capacitance distribution, $\sigma_C$ represents a variance of capacitance distribution, $\mu_x(0)$ is an average value of the mapping quantity x of the temperature control device at the initial time, $\mu_v$ represents a mathematical expectation of a temperature change speed, and j is a positive integer.

Figure 7:
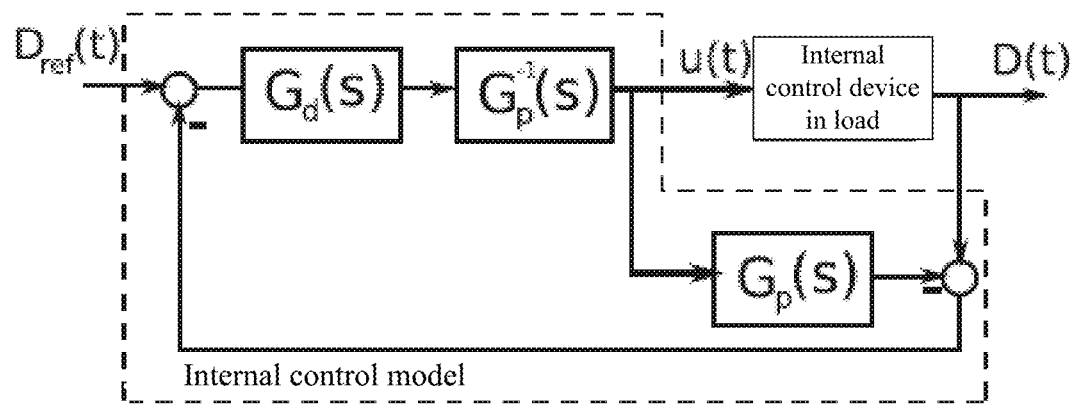
FIG. 7 is an internal control model of a load.

R, P and C follow the logarithmic normal distribution, a state switching period time T of the temperature control load relay satisfies $T \approx 2/\mu_v$, a largest amplitude A(t) of D(t) decays with time and has; $1-erf(1/z(t)) \leq A(t) \leq erf(1/z(t))$, wherein $z(t) = 2\sqrt{2}\sigma_{ref}(\mu_x(0) + \mu_v t - \frac{1}{2})$, and the actual dispatchable capacity D(t) of the temperature control load is expressed as follows:

$$D(t) = D_{SS}(\theta_{ref}) + L^{-1}\{G_P(s)0.5/s\} \quad (7).$$

Where $L^{-1}\{•\}$ represents an inverse Laplace transform, and $G_P(s)$ is a transfer function of a second-order linear time-invariant system.

$$G_P(s) = \frac{b_2 s^2 + b_1 s + b_0}{s^2 + 2\xi\omega_n s + \omega_n^2}; \quad (8)$$

$$\xi = \frac{ln(r)}{\sqrt{\pi^2 + ln^2(r)}}; \quad (9)$$

$$\omega_n = \frac{\pi\mu_v}{\sqrt{1-\xi^2}}; \quad (10)$$

$$b_0 = \frac{\omega_n^2(D_{SS}(\theta_{ref} + 0.5) - D_{SS}(\theta_{ref}))}{0.5}; \quad (11)$$

$$b_1 = 0.5\mu_v + 2D_{SS}(\theta_{ref})\xi\omega_n; \quad (12)$$

$$b_2 = D_{SS}(\theta_{ref}); \quad (13)$$

$$r = \frac{\left|erf\left(\frac{1}{0.9 + 2\sqrt{2}\,\sigma_{ref}}\right) - 0.5\right|}{\left|erf\left(\frac{1}{0.9}\right) - 0.5\right|}; \quad (14)$$

$$D_{SS}(\theta) = \left(1 + \frac{ln\left(1 + \frac{H}{\theta_a - \theta - H/2}\right)}{ln\left(1 + \frac{H}{PR + \theta - \theta_a - H/2}\right)}\right)^{-1}. \quad (15)$$

Where H represents a temperature control interval and has $H = \theta_+ - \theta_-$, s is a complex variable, and $b_0$, $b_1$ and $b_2$ are coefficients of the complex variable; $\xi$ represents a frequency domain transformation coefficient, $\omega_n$ represents a frequency domain independent variable. r is a symbol established for concision of a formula and does not have special actual meaning, $D_{SS}(\theta)$ represents a dispatchable capacity of the temperature control load group when a temperature setting value θ is stable, $\theta_{ref}$ represents a temperature setting value, and θ represents a temperature value. The internal control structure of the load is shown in FIG. 7, where $G_d(s)=0.5/s$ and is a transfer function of the expected dispatchable capacity $D_{ref}(t)$ at time point t. The whole response process or control process is described as follows in combination with FIG. 7.

A dispatching command is sent by a dispatching center, and the dispatching command is an expected dispatchable capacity $D_{ref}(t)$ at the time point t. An actual dispatchable capacity D(t) of the temperature control device at the time point t is calculated according to a formula (6) or a formula (7), a controlled temperature setting value $\theta_{ref}$ corresponding to the expected dispatchable capacity $D_{ref}(t)$ and a to-be-controlled temperature value $\theta_{r'}$ corresponding to the actual dispatchable capacity D(t) are obtained according to the expected dispatchable capacity $D_{ref}(t)$ and the actual dispatchable capacity D(t) and by use of formulas (8-15) and by performing a Laplace transformation. A temperature change quantity u(t) of the temperature control device at the time point t is calculated through $\theta_{ref} - \theta_{r'}$, and then through step 4, the temperature change quantity (temperature adjustment signal) $u_i(t)$ of the load clusters can be calculated, so that the response (control) process can be completed.

In step 4, in accordance with the defect that the precision of a temperature sensor of the temperature control load cannot reach the set value or the temperature control of a single temperature control load is limited, an adjustment strategy of the temperature control load clusters is introduced, thereby solving the problem of low response precision caused by parameter errors such as low precision of sensors.

For the defect that the precision of the temperature sensor of the temperature control load cannot reach the set value or the temperature control of the single temperature control load is limited, a manner of adjusting the temperature change quantity of different temperature control devices through the temperature control load clusters is considered. The manner is performed through the following specific steps: when a unified temperature control command u(t), i.e., the temperature change quantity of the temperature control device at time point t, sent from the dispatching center or the load aggregator is received, the temperature control load group is divided into L temperature control load clusters according to the types of the temperature control loads, and the temperature control of each temperature control load cluster is $u_i(t)$, so that the rough temperature adjustment quantity Δu' of each temperature control load is within a realizable range of the precision of the sensor (such as 0.5 degree), and the calculation expression of the temperature adjustment signal $u_i(t)$ of each load cluster is:

$$u_i(t) = \begin{cases} \text{floor}\left[\frac{u(t)}{\Delta u'}\right]\Delta u' & \text{if } l > L\frac{\text{mod}(u(t), \Delta u')}{\Delta u'} \\ \text{floor}\left[\frac{u(t)}{\Delta u'}\right]\Delta u' + \Delta u' & \text{if } l \leq L\frac{\text{mod}(u(t), \Delta u')}{\Delta u'} \end{cases}. \quad (16)$$

Where floor[•] is a function which takes an integer value of [•]; mod(•) represents a remainder of u(t)/Δu', l represents a serial number of one of load clusters, and L represents a number of the load clusters.

According to one embodiment of the present disclosure, a total of 10000 temperature control load clusters are selected. If all the temperature control load clusters respond to the response command sent from the dispatching center, the dispatching command i.e., the expected dispatchable capacity $D_{ref}(t)$ at time point t, is sent from the dispatching center at time point t; the actual dispatchable capacity D(t) of the temperature control device in the region is calculated by the load aggregator, and the adjustment temperature $u_i(t)$ of each load cluster is calculated through the algorithm of the present disclosure and is sent to each temperature control device, so that the response process is completed. The response parameters of the temperature control load clusters are shown in Table 1.

TABLE 1

Response Parameter Table of Temperature Control Load Clusters

| Variable | Value | Remarks |
| --- | --- | --- |
| Equivalent thermal resistance R | 2° C./KW | A definite value is taken in the situation 1 $\mu_R$ = 2° C./KW in the situation 2 |
| Equivalent thermal capacity C | 10° C./KW | $\mu_c$ = 10° C./KW in situation 1 and situation 2 |
| Output power P | 14 KW | A definite value is taken in the situation 1, P = 14 KW in the situation 2 |
| Lower limit set temperature $\theta_-$ | 19.5° C. | |
| Upper limit set temperature $\theta_+$ | 20.5° C. | |
| Outdoor temperature $\theta_\alpha$ | 32° C. | |

Remarks are as follows.

Situation 1: the equivalent thermal capacity C follows a logarithmic normal distribution when the output power P and the equivalent thermal resistances R of all the temperature control loads are the same.

Situation 2: R, P and C follow a logarithmic normal distribution, considering the equivalent thermal resistances R and the output powers P of the temperature control loads are considered not to be the same in the actual situation.

For the situation 1, equivalent thermal resistance R satisfies R=2° C./KW, the mathematical expectation of the distribution of the equivalent capacitance satisfies $\mu_c$=10° C./KW, and the output power P of the temperature control load satisfies P=14 KW. The variances of the logarithmic normal distribution of different equivalent heat capacities are substituted into a computer, and the adjustable margin of the load is calculated and is compared with an adjustable margin curve of an actual load.

Figure 2:
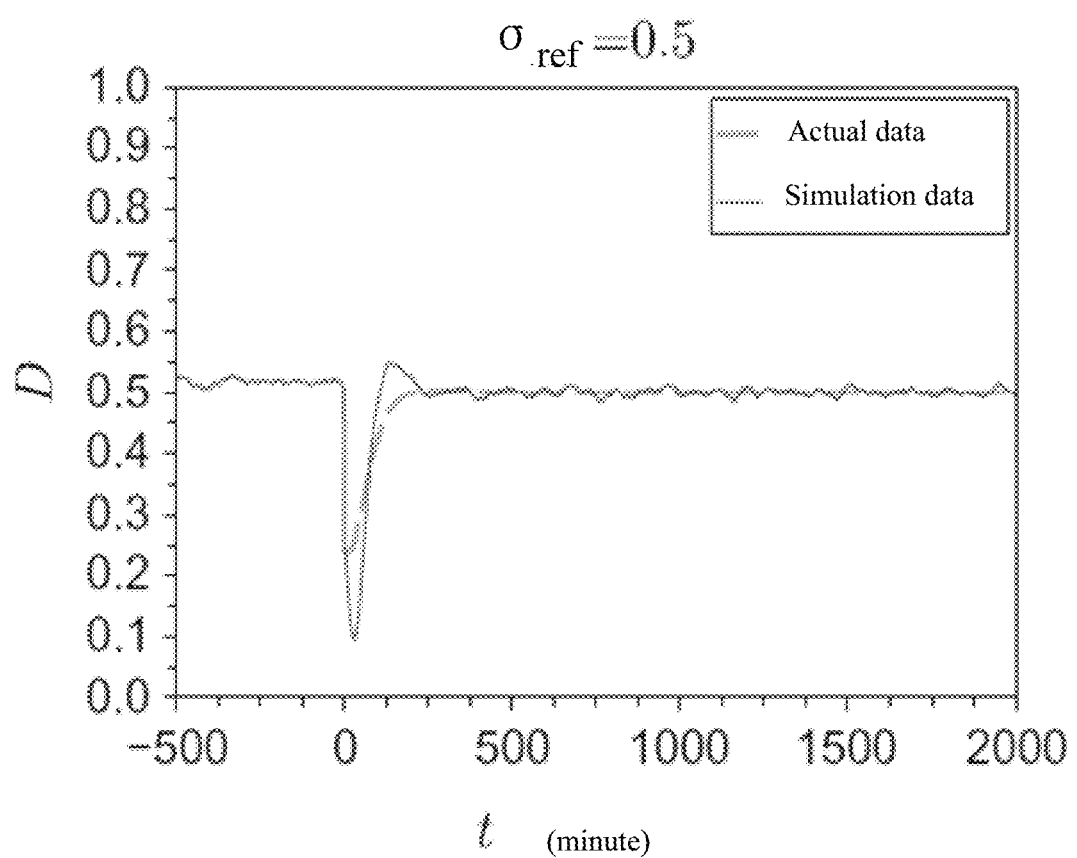
FIG. 2 is a load adjustment characteristic curve when a standard variance of an equivalent thermal capacity in a situation 1 is 0.5.

The rate of the variance to the mathematical expectation satisfies $$\sigma_{ref} = \frac{\sigma_C}{\mu_C} = 0.5,$$

when the standard variance $\sigma_C$=5 KW/° C. of the equivalent thermal capacity is taken, and the rate is substituted in the formula (6) to obtain the load adjustment characteristic curve when the standard variance of the equivalent thermal capacity in the situation 1 is 0.5, as shown in the FIG. 2, wherein the actual data indicates the curve of the actual load adjustment capacity D(t).

Figure 3:
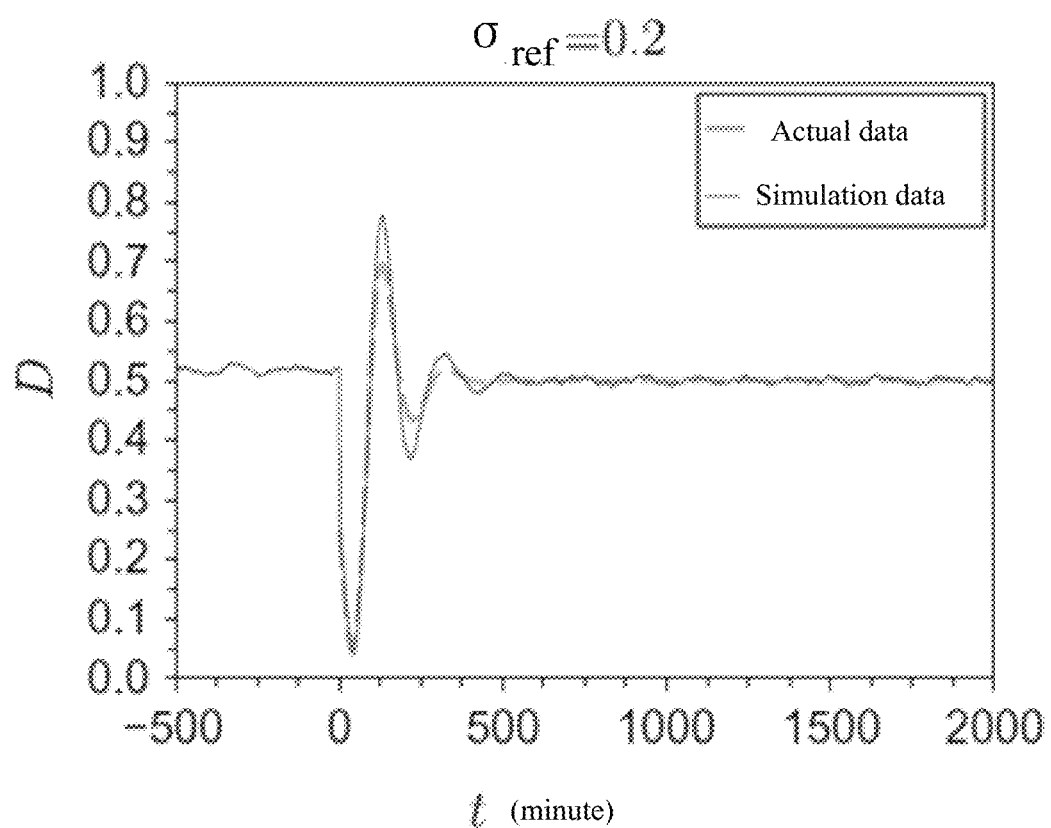
FIG. 3 is a load adjustment characteristic curve when a standard variance of an equivalent thermal capacity in a situation 1 is 0.2.

The probability value D(t) of the load is increased when the variance $\sigma_C$ of the equivalent thermal capacity of the temperature control load is decreased, and the load adjustment characteristic curve is shown in the FIG. 3 when the standard variance of the equivalent thermal capacity in the situation is 0.2 in condition that $$\sigma_{ref} = \frac{\sigma_C}{\mu_C} = 0.2.$$

Figure 4:
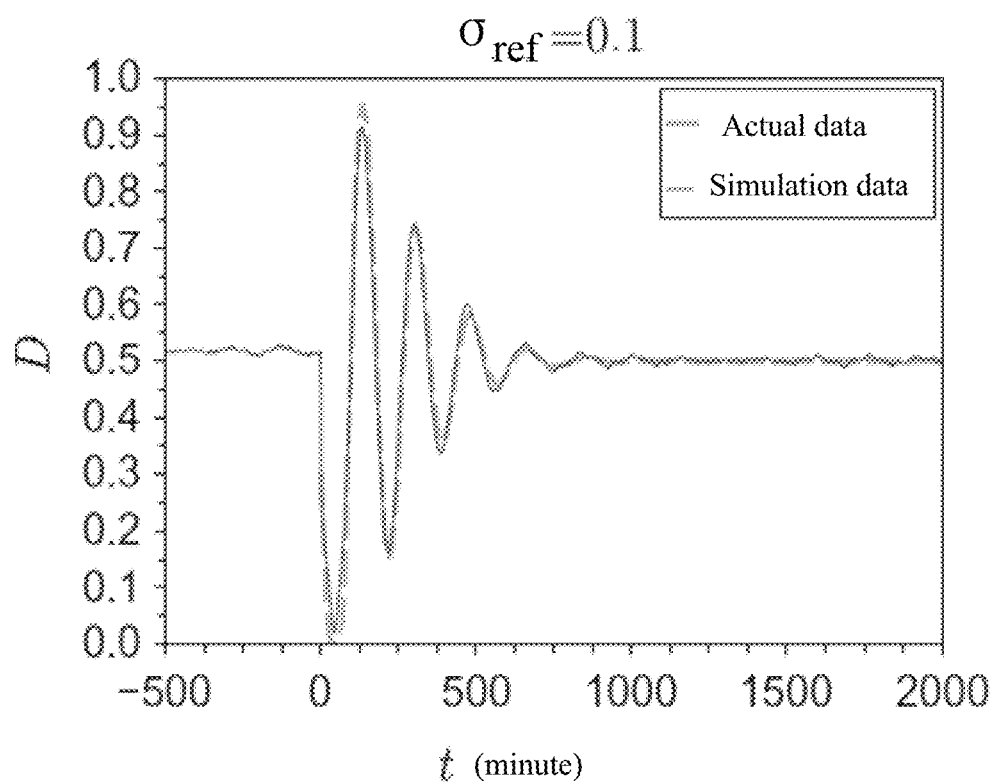
FIG. 4 is a load adjustment characteristic curve when a standard variance of an equivalent thermal capacity in a situation 1 is 0.1.

The load adjustment characteristic curve is shown in the FIG. 4 when the standard variance of the equivalent thermal capacity in the situation 1 is 0.1 in condition that $$\sigma_{ref} = \frac{\sigma_C}{\mu_C} = 0.1.$$

Figure 5:
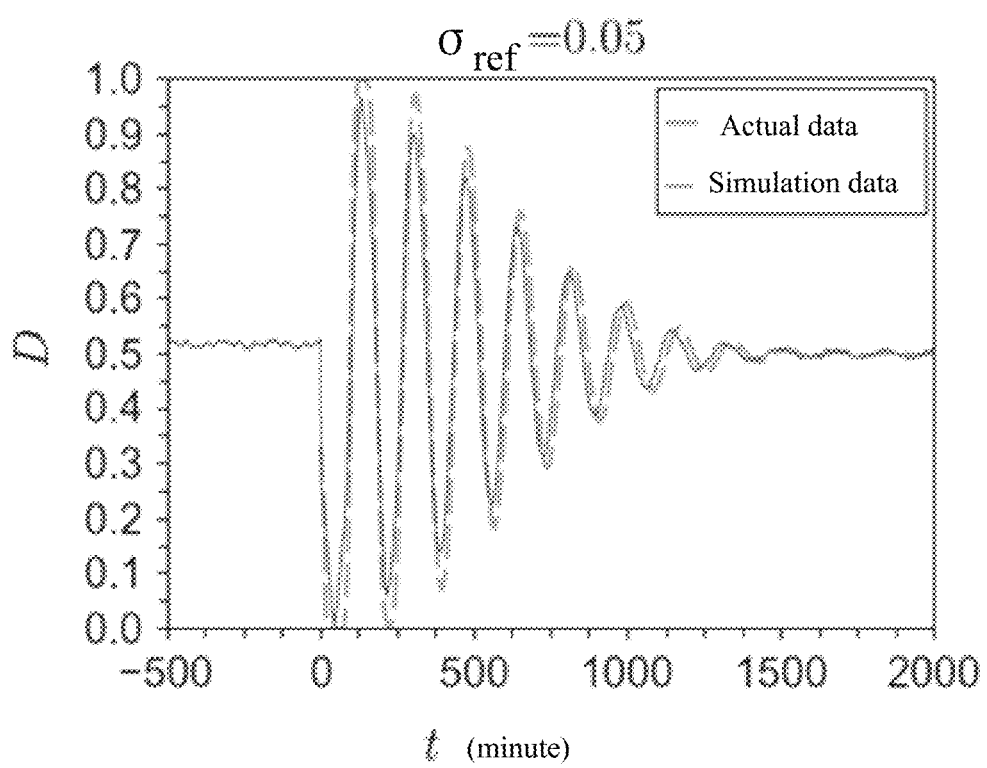
FIG. 5 is a load adjustment characteristic curve when a standard variance of an equivalent thermal capacity in a situation 1 is 0.05.

The load adjustment characteristic curve is shown in the FIG. 5 when the standard variance of the equivalent thermal capacity in the situation 1 is 0.05 in condition that $$\sigma_{ref} = \frac{\sigma_C}{\mu_C} = 0.05.$$

For the situation 2, i.e., the mathematical expectation of the equivalent thermal resistance satisfies $\mu_R$=2° C./KW, the mathematical expectation of the equivalent thermal capacity satisfies $\mu_C$=10° C./KW, and the mathematical expectation of the load power satisfies P=14 KW.

$$H = \theta_+ - \theta_- = 1;$$

$$D_{SS}(\theta) = \left(1 + \frac{\ln\left(1 + \frac{H}{\theta_a - \theta - H/2}\right)}{\ln\left(1 + \frac{H}{PR + \theta - \theta_a - H/2}\right)}\right)^{-1} =$$

$$\left(1 + \frac{\ln\left(1 + \frac{1}{32 - \theta - 0.5}\right)}{\ln\left(1 + \frac{1}{28 + 32 - \theta - 0.5}\right)}\right)^{-1} = \left(1 + \frac{\ln\left(1 + \frac{1}{31.5 - \theta}\right)}{\ln\left(1 + \frac{1}{59.5 - \theta}\right)}\right)^{-1};$$

$$b_2 = D_{SS}(\theta_{ref}) = \left(1 + \frac{\ln\left(1 + \frac{1}{31.5 - 20}\right)}{\ln\left(1 + \frac{1}{59.5 - 20}\right)}\right)^{-1} = 0.2307;$$

$$\mu_v = \text{mean}\left|\frac{d\theta_i(t)}{dt}\right| \approx \text{mean}(v_i) = \frac{\theta_a - \theta_{ref}}{CR} = \frac{32 - 20}{20} = 0.6;$$

If $\xi = 0.259$, $\omega_n = 0.033$, then $t_s = 4.6/\xi\omega_n = 525(\min)$, $$b_1 = 0.5\mu_v + 2D_{SS}(\theta_{ref})\xi\omega_n = 0.4525,$$

$$b_0 = \frac{\omega_n^2(D_{SS}(\theta_{ref} + 0.5) - D_{SS}(\theta_{ref}))}{0.5} =$$

$$\frac{0.033^2(0.2906 - 0.2307)}{0.5} \approx 0.000063294.$$

Figure 6:
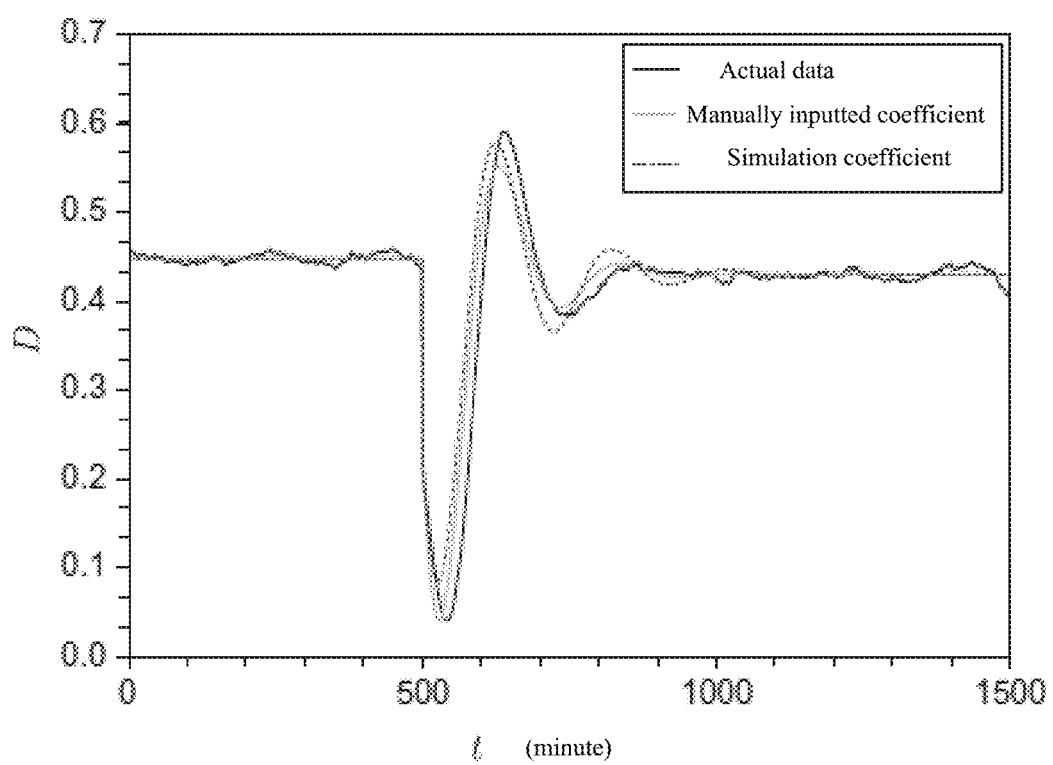
FIG. 6 is a load adjustment characteristic curve of various different standard variances in a situation 2.

When $$G_p(s) = \frac{b_2s^2 + b_1s + b_0}{s^2 + 2\xi\omega_n s + \omega_n^2}$$

is substituted, then $D(t)=D_{SS}(\theta_{ref})+L^{-1}\{G_P(s)0.5/s\}$ is substituted and t is substituted into $z(t)=2\sqrt{2}\sigma_{ref}(\mu_x(0)+\mu_v t-\frac{1}{2})$. According to $1-\text{erf}(1/z(t))\leq A(t)\leq \text{erf}(1/z(t))$, the amplitude of the probability value D(t) can be obtained, so that the load adjustment characteristic curve of various different standard variances in the situation 2 can be obtained, as shown in the FIG. 6. FIG. 6 includes 3 curves: an actual data curve, a simulation curve of manually inputted coefficients $\xi$, $\omega_n$, $b_0$, $b_1$, $b_2$ and a simulation curve of coefficients $\xi$, $\omega_n$, $b_0$, $b_1$, $b_2$ obtained through calculation of an algorithm in the present disclosure.

Figure 8:
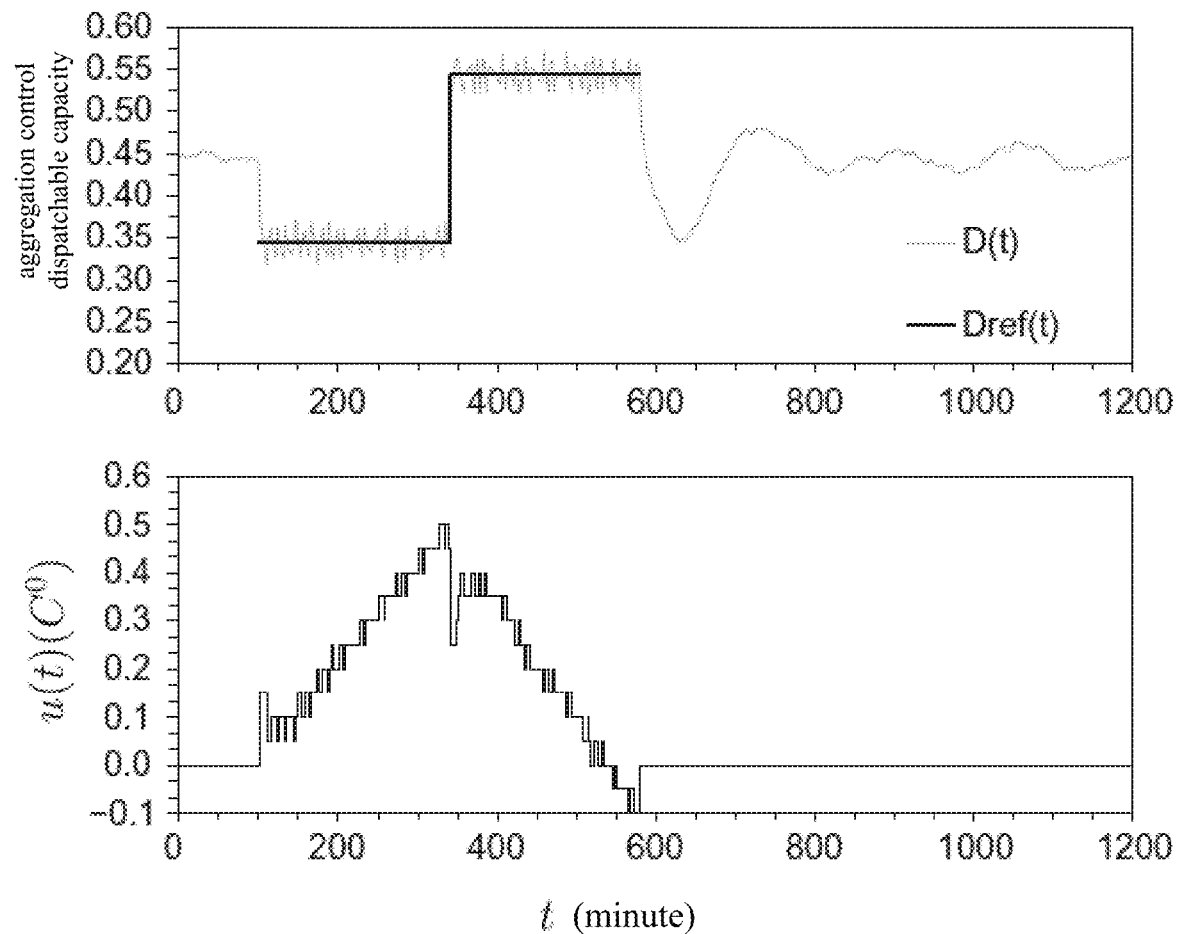
FIG. 8 is a curve of an aggregation control dispatchable capacity obtained when precision of a load sensor is 0.05 degree.

Selecting different rough temperature adjustment quantities may influence the adjustment capacity of the temperature control loads, and an aggregation control dispatchable capacity curve can be obtained when the precision of the load sensor is 0.05 degrees through the internal control structure of the load in FIG. 7 and in combination with formulas (1) and (7-15) when a rough temperature adjustment quantity is taken, as shown in the FIG. 8.

Figure 9:
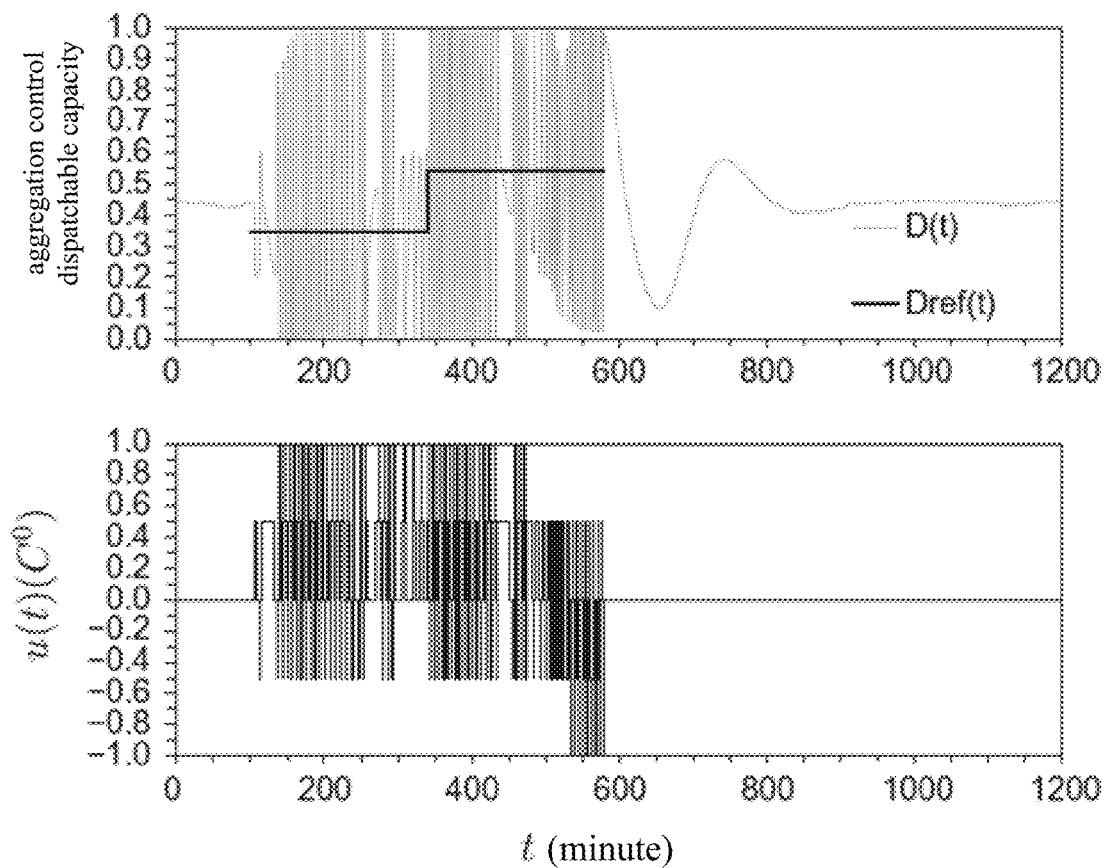
FIG. 9 is a curve of an aggregation control dispatchable capacity obtained when precision of a load sensor is 0.5 degree.

However, the dispatching curve may not be satisfied if the precision of the sensor is not high enough. When $\Delta u'=0.5$, the aggregation control dispatchable capacity curve is shown in the FIG. 9.

The dispatching capacity continuously fluctuates, but cannot change along with the needed curve. However, due to the precision of the sensor and the limit of the temperature adjustment range of the temperature control load, requirements for dispatching precision are not satisfied possibly. Then favorable load response cannot be obtained, and at this moment, the load clusters are introduced to solve the problem.

For example, the adjustable range of each temperature control load satisfies $\Delta u'=0.5$, but the control precision needs to satisfy $\Delta u=0.05$. If the group is divided into $L=10$ aggregation types, and when $t=t_m$, $u(t)=1.15$, then according to $$u_l(t) = \begin{cases} \text{floor}\left[\frac{u(t)}{\Delta u'}\right]\Delta u' & \text{if } l > L\frac{\text{mod}(u(t), \Delta u')}{\Delta u'} \\ \text{floor}\left[\frac{u(t)}{\Delta u'}\right]\Delta u' + \Delta u' & \text{if } l \leq L\frac{\text{mod}(u(t), \Delta u')}{\Delta u'} \end{cases}.$$

$u_l(t_m)=1.15$ for the first, the second and the third aggregation types, and $u_l(t_m)=1.1$ for the remaining seven aggregation types.

Figure 10:
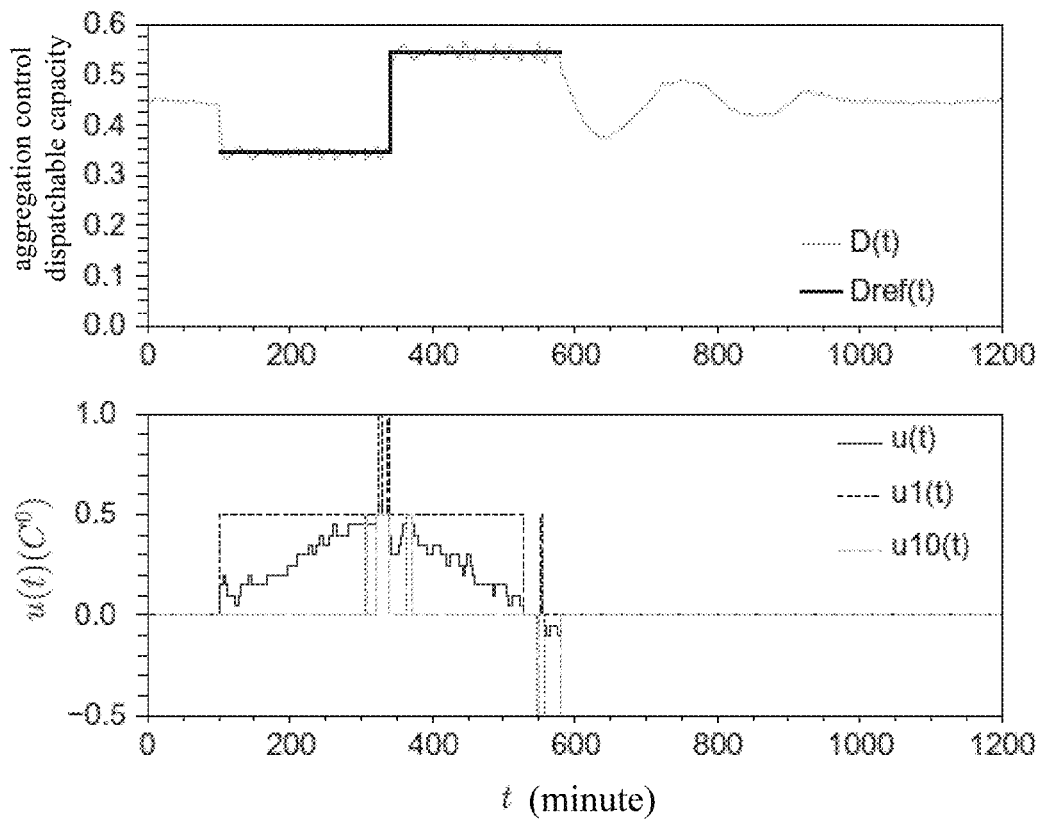
FIG. 10 is a curve of an aggregation control dispatchable capacity controlled by load clusters.

The adjustable capacity curves controlled after the control load clusters are introduced is shown in FIG. 10.

The present disclosure discloses a user side load response method based on adjustment and control on temperature of load clusters. Load control is achieved by adjusting the set temperature of temperature control load clusters, and requirements for a power grid side load response are satisfied. The user side load response method includes the steps: firstly, thermodynamic modeling is performed on a temperature control load to obtain a temperature control model in direct load control; a mapping quantity is constructed to describe the change state of the temperature control load relay switch; adjustable capacity of the temperature control load is obtained through the mapping quantity; and the temperature control load clusters are introduced to solve the problem that control precision cannot satisfy conditions. The present disclosure sufficiently considers the adjustment characteristics of the temperature control load and the adjustment characteristics of the temperature control load clusters, so that the requirements for the power grid side load response are satisfied. The parameter difference of the temperature control device is considered, so that the calculation of the adjustable capacity of the temperature control device can be more objective and practical. A load cluster control strategy is adopted, so that the temperature control load response precision can be improved.

The above only describes preferred embodiments of the present disclosure. It should be noted that those ordinary skilled in the art can still make several improvements and variations on the premise of not departing from the technical principle of the present disclosure. These improvements and variations can also be regarded in the protection scope of the present disclosure.

What is claimed is:

1. A user side load response method based on adjustment and control on temperature of load clusters, comprising:
   receiving, by a load aggregator, a dispatching command sent from a dispatching center at a time point t, wherein the dispatching command is an expected dispatchable capacity $D_f(t)$ at the time point t;
   performing calculation, by the load aggregator, to obtain an actual dispatchable capacity D(t) of a temperature control load at the time point t;
   obtaining a controlled temperature setting value $\theta_{ref}$ of the temperature control load corresponding to the expected dispatchable capacity $D_{ref}(t)$, and obtaining a to-be-controlled temperature value $\theta_f$ of the temperature control load corresponding to the actual dispatchable capacity D(t);

calculating, by the load aggregator, a temperature change quantity u(t) of the temperature control load at the time point t through $\theta_{ref} - \theta_t$;

dividing, by the load aggregator, a temperature control load group that participates in adjustment and control into a plurality of temperature control load clusters, and performing calculation to obtain a temperature change quantity $u_i(t)$ of each of the plurality of temperature control load clusters according to the temperature change quantity u(t);

sending, by the load aggregator, temperature change quantity $u_i(t)$ of each of the plurality of temperature control load clusters, to temperature control loads in the each of the plurality of temperature control load clusters, receiving, by the temperature control loads in the each of the plurality of temperature control load clusters, the temperature change quantity $u_i(t)$ of each of the plurality of temperature control load clusters, and adjusting, by the temperature control loads in the each of the plurality of temperature control load clusters, actual dispatchable capacities D(t) of the temperature control loads in the each of the plurality of temperature control load clusters according to the temperature change quantity $u_i(t)$ of each of the plurality of temperature control load clusters, wherein the temperature control load group comprises a plurality of temperature control loads, wherein the dividing, by the load aggregator, the temperature control load group that participates in adjustment and control into the plurality of temperature control load clusters comprises:

dividing the temperature control load group into the plurality of temperature control load clusters according to types of temperature control loads.

2. The user side load response method according to claim 1, wherein performing calculation, by the load aggregator, to obtain a temperature change quantity $u_i(t)$ of each of the plurality of temperature control load clusters according to the temperature change quantity u(t) comprises:

$$u_i(t) = \begin{cases} \text{floor}\left[\frac{u(t)}{\Delta u'}\right]\Delta u' & \text{if } l > L\frac{\text{mod}(u(t), \Delta u')}{\Delta u'} \\ \text{floor}\left[\frac{u(t)}{\Delta u'}\right]\Delta u' + \Delta u' & \text{if } l \leq L\frac{\text{mod}(u(t), \Delta u')}{\Delta u'} \end{cases},$$

wherein floor[•] is a function which takes an integer value of [•], mod(•) represents a remainder of u(t)/$\Delta u'$, l represents a serial number of one of load clusters, L represents a number of the load clusters, and $\Delta u'$ represents a temperature adjustment precision of the temperature control loads.

3. The user side load response method according to claim 1, wherein switching-on powers of all the temperature control loads are the same, and the performing calculation, by the load aggregator, to obtain the actual dispatchable capacity D(t) of the temperature control load at the time point t comprises:

$$D(t) \approx \frac{1}{6} + \frac{1}{6}erf\left[\frac{ln(1) - ln(\mu_x(0) + \mu_v t)}{\sqrt{2}\,\sigma_{ref}}\right] +$$

$$\frac{1}{2} \times \sum_{j=2}^{\infty} (-1)^{j+1} erf\left[\frac{ln(j) - ln(\mu_x(0) + \mu_v t)}{\sqrt{2}\,\sigma_{ref}}\right],$$

wherein output power P and equivalent thermal resistances R of all the temperature control loads are the same, an equivalent thermal capacity C follows logarithmic normal distribution and has $ln(C) \sim N(\mu_C, \sigma_C)$, wherein erf[•] is a gauss error function, $\mu_x(t)$ is an average value of a change state mapping quantity $x_i(t)$ of a temperature control load relay switch at time point t, $\sigma_{ref}$ is a ratio of a variance to a mathematical expectation and has $$\sigma_{ref} = \frac{\sigma_C}{\mu_C},$$

wherein $\mu_C$ is a mathematical expectation of capacitance distribution, $\sigma_C$ represents a variance of the capacitance distribution, $\mu_x(0)$ is an average value of a change state mapping quantity $x_i(0)$ of the temperature control load relay switch at an initial time, and $\mu_v$ represents a mathematical expectation of a temperature change speed, and j is a positive integer.

4. The user side load response method according to claim 1, wherein the performing calculation, by the load aggregator, to obtain the actual dispatchable capacity D(t) of the temperature control load at the time point t comprises:

wherein P is an output power of the temperature control load, R is an equivalent thermal resistance, C is an equivalent thermal capacity of the temperature control load and follows a logarithmic normal distribution, wherein a state switching period T of a temperature control load relay satisfies $T \approx 2/\mu_v$, a largest amplitude A(t) of D(t) decays with time and has $1-erf(1/z(t)) \leq A(t) \leq erf(1/z(t))$, wherein $z(t)=2\sqrt{2}\sigma_{ref}(\mu_x(0)+\mu_v t-\frac{1}{2})$, and the actual dispatchable capacity D(t) of the temperature control load is expressed as follows:

$$D(t) = D_{SS}(\theta_{ref}) + L^{-1}\{G_P(s)0.5/s\}$$

wherein $L^{-1}\{\cdot\}$ represents an inverse Laplace transform, $G_P(s)$ is a transfer function of a second-order linear time-invariant system, $D_{SS}(\theta)$ represents a dispatchable capacity of the temperature control load group when a temperature setting value $\theta$ is stable, $\theta_{ref}$ represents a temperature setting value, $\sigma_{ref}$ is a ratio of a variance to a mathematical expectation, $\mu_v$ represents a mathematical expectation of a temperature change speed, $\mu_x(t)$ is an average value of a change state mapping quantity $x_i(t)$ of a temperature control load relay switch at time point t, and $\mu_x(0)$ is an average value of a change state mapping quantity $x_i(0)$ of the temperature control load relay switch at an initial time.

5. The user side load response method according to claim 4, wherein the controlled temperature setting value $\theta_{ref}$ of the temperature control load corresponding to the expected dispatchable capacity $D_{ref}(t)$ and the to-be-controlled temperature value $\theta_t$ of the temperature control load corresponding to the actual dispatchable capacity D(t) are obtained according to the following formulas:

$$G_P(s) = \frac{b_2 s^2 + b_1 s + b_0}{s^2 + 2\xi\omega_n s + \omega_n^2};$$

$$\xi = \frac{ln(r)}{\sqrt{\pi^2 + ln^2(r)}};$$

$$\omega_n = \frac{\pi\mu_v}{\sqrt{1-\xi^2}};$$

-continued $$b_0 = \frac{\omega_n^2(D_{SS}(\theta_{ref} + 0.5) - D_{SS}(\theta_{ref}))}{0.5};$$

$$b_1 = 0.5\mu_v + 2D_{SS}(\theta_{ref})\xi\omega_n$$

$$b_2 = D_{SS}(\theta_{ref});$$

$$r = \frac{\left|erf\left(\frac{1}{0.9 + 2\sqrt{2}\,\sigma_{ref}}\right) - 0.5\right|}{\left|erf\left(\frac{1}{0.9}\right) - 0.5\right|};$$

$$D_{SS}(\theta) = \left(1 + \frac{\log\left(1 + \frac{H}{\theta_a - \theta - H/2}\right)}{\log\left(1 + \frac{H}{PR + \theta - \theta_a - H/2}\right)}\right)^{-1};$$

wherein s is a complex variable, $b_0$, $b_1$ and $b_2$ are coefficients of the complex variable, $\xi$ represents a frequency domain transformation coefficient, $\omega_n$ represents a frequency domain independent variable, $D_{SS}(\theta)$ represents the dispatchable capacity of the temperature control load group when the temperature setting value $\theta$ is stable, $\theta_{ref}$ represents the temperature setting value, H represents a temperature control interval and has $H=\theta_+-\theta_-$, $\theta$ represents the temperature value, and $\theta_a$ represents an environment temperature.

6. The user side load response method according to claim 5, wherein the change state mapping quantity $x_i(t)$ of the ith temperature control load relay switch is expressed as:

$$x_i(t) = x_i^0 + v_i t;$$

wherein $$\left|\frac{d\theta_i(t)}{dt}\right| \approx v_i = \frac{\theta_a - \theta_{ref}}{C_i R_i}, \text{ and } x_i^0 = \begin{cases} 1 + \theta_i(0) - \theta_-^{post} & \text{if } \frac{d\theta_i(0^-)}{dt} > 0 \\ \theta_+^{post} - \theta_i(0) & \text{if } \frac{d\theta_i(0^-)}{dt} < 0 \end{cases};$$

wherein $\theta_i(t)$ represents a temperature value of an energy storage medium of an ith temperature control load at the time point t, $v_i$ represents a temperature change rate of the ith temperature control load at the time point t, $C_i$ represents an equivalent thermal capacity of the ith temperature control load, $R_i$ represents an equivalent thermal resistance of the ith temperature control load, $x_i^0$ represents a value of the state mapping quantity of the ith temperature control load relay switch at the initial time, $\theta_+^{post}$ and $\theta_-^{post}$ respectively represent an upper limit value and a lower limit value of the temperature after temperature control, $\theta_i(0)$ represents an internal temperature of the load energy storage medium of the ith temperature control load at the initial time, and $\theta_i(0^-)$ represents an internal temperature of the load energy storage medium of the ith temperature control load at a moment before the initial time.

7. The user side load response method according to claim 6, wherein the temperature of the energy storage medium of each of temperature control loads satisfies the following formula:

$$\frac{d\theta(t)}{dt} = -\frac{1}{CR}[\theta(t) - \theta_a + m(t)RP + w(t)];$$

$$m(t^+) = \begin{cases} 0 & \text{if } \theta(t) \leq \theta_- + u(t) \\ 1 & \text{if } \theta(t) \geq \theta_+ + u(t) \\ m(t) & \text{else} \end{cases};$$

wherein $\theta(t)$ represents the temperature value of the energy storage medium of the temperature control load at the time point t, P is a constant output power when the temperature control load is switched on, w(t) represents an unpredictable thermal disturbing influence, m(t) represents relay states, m(t)=1 represents a switched-on state and m(t)=0 represents a switched-off state, t is time, $\theta_+$ represents an upper limit value of the temperature setting value before a load response; $\theta_-$ represents a lower limit value of the temperature setting value before a load response, $t^+$ represents a moment after the time point t, u(t) represents a change quantity of the temperature setting value at the time point t, and $m(t^+)$ represents a relay state at the moment after the time point t.

8. A user side load response method based on adjustment and control on temperature of load clusters, comprising:
performing fundamental thermodynamic modeling, by a load aggregator, on a temperature control load, and establishing a temperature control model for directly controlling a temperature control load;
constructing a mapping quantity, by the load aggregator, to describe a change state of a temperature control load relay switch;
constructing a direct relation, by the load aggregator, between the mapping quantity and an adjustable capacity of the temperature control load; and
dividing, by the load aggregator, a temperature control load group that participates in adjustment and control into a plurality of temperature control load clusters, and performing adjustment on temperature change quantity of each of the plurality of temperature control load clusters, wherein the temperature control load group comprises a plurality of temperature control loads,
wherein the dividing, by the load aggregator, a temperature control load group that participates in adjustment and control into a plurality of temperature control load clusters, and performing adjustment on temperature change quantity of each of the plurality of temperature control load clusters comprises:
sending, by the load aggregator, a dispatching command by a dispatching center, wherein the dispatching command is an expected dispatchable capacity $D_{ref}(t)$ at the time point t;
calculating a temperature change quantity u(t) of a temperature control device at the time point t;
dividing, by the load aggregator, a temperature control load group into L temperature control load clusters according to types of temperature control loads, wherein a temperature adjustment signal of each of the temperature control load clusters is $u_i(t)$, so that a rough temperature adjustment quantity $\Delta u'$ of each of the temperature control loads is within a realizable range, and the temperature adjustment signal $u_i(t)$ of each of the load cluster is calculated through the following formulas:

$$u_i(t) = \begin{cases} \text{floor}\left[\frac{u(t)}{\Delta u'}\right]\Delta u' & \text{if } l > L\frac{\text{mod}(u(t), \Delta u')}{\Delta u'} \\ \text{floor}\left[\frac{u(t)}{\Delta u'}\right]\Delta u' + \Delta u' & \text{if } l \leq L\frac{\text{mod}(u(t), \Delta u')}{\Delta u'} \end{cases} \quad (16)$$

floor[•] is a function which takes an integer value of [•]; mod(•) represents a remainder of u(t)/Δu', l represents a serial number of one of the plurality of temperature control load clusters, and L represents a number of the plurality of temperature control load clusters; and sending, by the load aggregator, the temperature adjustment signal $u_i(t)$ of each of the load cluster, to temperature control loads in the each of the load cluster, receiving, by the temperature control loads in the each of the plurality of temperature control load clusters, the temperature change quantity $u_i(t)$ of each of the plurality of temperature control load clusters, and adjusting, by the temperature control loads in the each of the plurality of temperature control load clusters, actual dispatchable capacities D(t) of the temperature control loads in the each of the plurality of temperature control load clusters according to the temperature change quantity $u_i(t)$ of each of the plurality of temperature control load clusters.

9. The user side load response method according to claim 8, wherein the temperature control model for directly controlling the temperature control load is:

$$\frac{d\theta(t)}{dt} = -\frac{1}{CR}[\theta(t) - \theta_a + m(t)RP + w(t)] \text{ and} \quad (1)$$

$$m(t^+) = \begin{cases} 0 & \text{if } \theta(t) \leq \theta_- + u(t) \\ 1 & \text{if } \theta(t) \geq \theta_+ + u(t) \\ m(t) & \text{else} \end{cases}$$

wherein $\theta'(t)$ represents a temperature value of an energy storage medium of the temperature control load at time point t, $\theta_a$ represents an environment temperature, C and R respectively represent an equivalent thermal capacity and an equivalent thermal resistance of the temperature control load, P represents a constant output power when the temperature control load is switched on, w(t) represents an unpredictable thermal disturbing influence, m(t) represents relay states, m(t)=1 represents a switched-on state and m(t)=0 represents a switched-off state, t represents time, $\theta_+$ represents an upper limit value of a temperature setting value before a load response, $\theta_-$ represents a lower limit value of the temperature setting value before the load response, $t^+$ represents a moment after the time point t, u(t) represents a change quantity of the temperature setting value at the time point t, and $m(t^+)$ represents a relay state at the moment after the time point t.

10. The user side load response method according to claim 8, wherein the mapping quantity of a change state of the ith temperature control load relay switch $x_i(t)$ is expressed as:

$$x_i(t) = x_i^0 + v_i t \quad (2);$$

wherein $$\left|\frac{d\theta_i(t)}{dt}\right| \approx v_i = \frac{\theta_a - \theta_{ref}}{C_i R_i}; \quad (3)$$

$$x_i^0 = \begin{cases} 1 + \theta_i(0) - \theta_-^{post} & \text{if } \frac{d\theta_i(0^-)}{dt} > 0 \\ \theta_+^{post} - \theta_i(0) & \text{if } \frac{d\theta_i(0^-)}{dt} < 0 \end{cases} \quad (4)$$

wherein $\theta_i(t)$ represents a temperature value of the energy storage medium of an ith temperature control device at the time point t, $v_i$ represents a temperature change rate of the ith temperature control device at the time point t, $\theta_{ref}$ represents a temperature setting value, $C_i$ represents an equivalent thermal capacity of the ith temperature control device, $R_i$ represents an equivalent thermal resistance of the ith temperature control device, $x_i^0$ represents a value of mapping quantity of the ith temperature control device at an initial time, $\theta_+^{post}$ and $\theta_-^{post}$ respectively represent an upper limit value and a lower limit value of the temperature after temperature control, $\theta_i(0)$ represents an internal temperature of the energy storage medium of the ith temperature control device at the initial time, and $\theta_i(0^-)$ represents an internal temperature of the energy storage medium of the ith temperature control device at the moment before the initial time.

11. The user side load response method according to claim 10, wherein in condition that switching-on powers of all of temperature control loads are the same, an actual dispatchable capacity D(t) of the temperature control load is calculated by the following formulas:

$$D(t) = \frac{Pr[x(t) < 1]}{3} + \sum_{k=1}^{\infty} Pr[x(t) < 2k+1] - Pr[x(t) < 2k]; \quad (5)$$

wherein Pr[•] is a probability operator indicating a probability value of satisfying [•], k is a positive integer, and x(t) represents a set of the mapping quantity $x_i$ (t) of the temperature control device.

12. The user side load response method according to claim 11, wherein in condition that output power P and equivalent thermal resistances R of all the temperature control loads are the same, the equivalent thermal capacity C follows a logarithmic normal distribution and has ln(C) $\sim N(\mu_C, \sigma_C)$, the actual dispatchable capacity D(t) of the temperature control load can be approximatively estimated as:

in condition that $$\sigma_{ref} = \frac{\sigma_C}{\mu_C},$$

$$D(t) \approx \frac{1}{6} + \frac{1}{6}erf\left[\frac{ln(1) - ln(\mu_x(0) + \mu_v(t)}{\sqrt{2}\,\sigma_{ref}}\right] + \quad (6)$$

$$\frac{1}{2} \times \sum_{j=2}^{\infty} (-1)^{j+1} erf\left[\frac{ln(j) - ln(\mu_x(0) + \mu_v t)}{\sqrt{2}\,\sigma_{ref}}\right];$$

wherein erf[•] is a gauss error function, and $\mu_x(t)$ is an average value of the mapping quantity x of the temperature control device at the time point t, $\sigma_{ref}$ is a ratio of a variance to a mathematical expectation, and $\mu_C$ is a mathematical expectation of capacitance distribution, $\sigma_C$ represents a variance of capacitance distribution, $\mu_x(0)$ is an average value of the mapping quantity x of the temperature control device at the initial time, $\mu_v$ represents a mathematical expectation of a temperature change speed, and j is a positive integer.

13. The user side load response method according to claim 12, wherein R, P and C follow the logarithmic normal distribution, a state switching period time T of the temperature control load relay satisfies $T \approx 2/\mu_v$, a largest amplitude A(t) of D(t) decays with time and has; 1−erf (1/z(t))≤A(t) ≤erf(1/z(t), wherein $z(t)=2\sqrt{2}\sigma_{ref}(\mu_x(0)+\mu_v t-\frac{1}{2})$, and the actual dispatchable capacity D(t) of the temperature control load is expressed as follows:

$$D(t) = D_{SS}(\theta_{ref}) + L^{-1}\{G_P(s)0.5/s\} \quad (7);$$

wherein $L^{-1}\{\bullet\}$ represents an inverse Laplace transform, and $G_p(s)$ is a transfer function of a second-order linear time-invariant system, $$G_p(s) = \frac{b_2 s^2 + b_1 s + b_0}{s^2 + 2\xi\omega_n s + \omega_n^2} \qquad (8)$$

$$\xi = \frac{\ln(r)}{\sqrt{\pi^2 + \ln^2(r)}}; \qquad (9)$$

$$\omega_n = \frac{\pi\mu_v}{\sqrt{1-\xi^2}}; \qquad (10)$$

$$b_0 = \frac{\omega_n^2 (D_{SS}(\theta_{ref} + 0.5) - D_{SS}(\theta_{ref}))}{0.5}; \qquad (11)$$

$$b_1 = 0.5\mu_v + 2 D_{SS}(\theta_{ref})\xi\omega_n; \qquad (12)$$

$$b_2 = D_{SS}(\theta_{ref}); \qquad (13)$$

$$r = \frac{\left| erf\left(\frac{1}{0.9 + 2\sqrt{2}\,\sigma_{ref}}\right) - 0.5 \right|}{\left| erf\left(\frac{1}{0.9}\right) - 0.5 \right|}; \qquad (14)$$

$$D_{SS}(\theta) = \left(1 + \frac{\log\left(1 + \frac{H}{\theta_a - \theta - H/2}\right)}{\log\left(1 + \frac{H}{PR + \theta - \theta_a - H/2}\right)}\right)^{-1}; \qquad (15)$$

wherein s is a complex variable, and $b_0$, $b_1$ and $b_2$ are coefficients of the complex variable; $\xi$ represents a frequency domain transformation coefficient, $\omega_n$ represents a frequency domain independent variable, $D_{SS}(\theta)$ represents a dispatchable capacity of the temperature control load group when a temperature setting value $\theta$ is stable, $\theta_{ref}$ represents a temperature setting value, H represents a temperature control interval and has $H=\theta_+ - \theta_-$, and $\theta$ represents a temperature value.

14. The user side load response method according to claim 13, wherein the calculating, by the load aggregator, a temperature change quantity u(t) of a temperature control device at the time point t comprise:

calculating an actual dispatchable capacity D(t) of the temperature control device at the time point t according to a formula (6) or a formula (7), obtaining a controlled temperature setting value of the temperature control load $\theta_{ref}$ corresponding to the expected dispatchable capacity $D_{ref}(t)$ and a to-be-controlled temperature value $\theta_{t'}$ of the temperature control load corresponding to the actual dispatchable capacity D(t) according to the expected dispatchable capacity $D_{ref}(t)$ and the actual dispatchable capacity D(t) and by use of formulas (8-15) and by performing a Laplace transformation, and calculating the temperature change quantity u(t) of the temperature control device at the time point t through $\theta_{ref} - \theta_{t'}$.

* * * * *